United States Patent Office 3,467,683
Patented Sept. 16, 1969

3,467,683
METAL ORGANOPHOSPHORUS COMPOUNDS
Samuel Edward Harson, Warrington, and Edward Fogg, Longsight, Manchester, England, assignors to Hardman & Holden Limited, Miles Platting, Manchester, Lancashire, England, a British company
No Drawing. Filed Dec. 6, 1965, Ser. No. 512,020
Claims priority, application Great Britain, Dec. 9, 1964, 50,183
Int. Cl. C07c 9/02
U.S. Cl. 260—403      1 Claim

ABSTRACT OF THE DISCLOSURE

Compounds containing phosphorus divalent metals, carboxylic acid radicals and possibly alkoxy or aryloxy groups are prepared by heating carboxylic acid salts of divalent metals with alkyl or aryl phosphates or phosphite, or acid alkyl phosphates or phosphites.

---

This invention relates to phosphorus-containing metal-organic compounds and methods for preparation of such compounds.

The compounds according to the invention comprise one or more divalent metals linked through oxygen atoms to a phosphorus atom or atoms, one carboxylic acid radical attached to the divalent metal or one or more carboxylic acids attached to the divalent metals when more than one metal is used, and, in some cases, one or more alkoxy groups or aryl groups attached to the phosphorus atom or atoms.

The compounds are made according to the invention by heating carboxylic acid salts of divalent metals with alkyl or aryl phosphates or phosphites, or acid alkyl phosphates or phosphites. The alcohols, esters, water or carboxylic acids which are liberated may be distilled off if desired. In some cases, useful products may be obtained by distilling off only a part of the alcohols, phenols, esters, carboxylic acids or water which are liberated, the residue remaining in the product as a diluent, especially when the ester is a less volatile one.

The phosphates and phosphites above referred to may be used in the form of mono, di, tri or higher esters of ortho-phosphoric acid, poly-phosphoric acids, i.e. acids which contain a phosphorus atom linked to one or more phosphorus atoms by oxygen atoms; or phosphorous acids.

The divalent metal salts may be salts of one or two carboxylic acids of up to 30 carbon atoms, and may be neutral or basic in composition. Where two acids are used there will usually be a total number of carbon atoms of at least 8. The metals used may be calcium, zinc, cadmium, cobalt, manganese, copper, magnesium, barium, lead or zirconium in the form of the zirconyl radical.

The procedure according to the invention may result in the formation of a variety of compounds by means of a reaction of one of the following types or of similar types, where R is an alkyl or aryl group, D is a divalent metal and $X^1$, $X^2$ are carboxylic acid radicals and $n=$ 1, 2 or 3.

(1) $PO(OR)_3 + nDX^1X^2 = PO(OR)_{3-n}(ODX^2)_n + nRX^1$ (2) $PO(OR)_3 + nHODX^1 = PO(OH)_{3-n}(ODX^1)_n + nROH$ (3) $PO(OH)(OR)_2 + 3DX^1X^2 = PO(ODX^2)_3 + HX^1 + 2RX^1$ (4) $PO(OH)_2(OR) + 3DX^1X^2 = PO(ODX^2)_3 + 2HX^1 + RX^1$

Similar reactions may be carried out with polyphosphates, phosphorous acid and phosphites.

Compounds of the following formulae may be prepared by these procedures, it being understood that where a compound contains more than one metal or acid radical, these may be the same or different:

$OP(OH)_2ODX$
$(RO)_2P(ODX)$
$OP(OH)(ODX)_2$
$OP(ODX)_3$
$P(ODX)_3$
$(XDO)_2.(PO).O.D.O.(PO)(ODX)_2$
$(XDO)_2PO.(OPO.ODX)_nO.PO(ODX)_2$.

where $n=0$ or an integer. These compounds are mentioned by way of example only.

Products according to the invention are useful as paint driers, lubricant and oil additives, insecticides, plasticisers, PVC stabilisers, epoxy resin curing agents and as rust preventatives or components of rust preventive compositions.

In the following description, the acid radical derived from tall oil fatty acids is denoted by T, and the acid radical derived from the saturated, highly branched, tertiary carboxylic acids known commercially as Versatic acids, is denoted by V.

The invention is illustrated but not limited by the following examples:

EXAMPLE 1

Cobalt versatate phosphate $PO(OCOV)_3$ 368 gms. of Versatic acid 911 (2 mol) were heated to 80° C. in a flask fitted with a stirrer. 192 gms. cobalt hydrate (2 mol) were added and stirred in followed by 130 gms acetic acid (2 mol+8% XS) which was added over 8 minutes. The mixture was then heated to distill off all the water formed in the reaction. Over 2¼ hours the temperature rose to 190° C. and 67 mls. aqueous and 20 mls. organic material distilled off. Vacuum was then applied and allowed to rise to 70 cms. over 10 minutes. This gave a final distillate of 84 mls. aqueous and 34 mls. organic material. The vacuum was then released and the product allowed to cool to 171° C. when 177.4 gms. of tributyl phosphate (⅔ mol) were added over 20 minutes while the temperature dropped to 134° C. and the viscosity decreased. The temperature was then raised to distill off the ester formed in the reaction and while the temperature rose to 231° C. over 9 hours, 164 mls. of ester distilled. Vacuum was then applied and 98 mls. more ester distilled at a flask temperature of 200° C. over 3 hrs. The product was diluted with white spirit until the cobalt content was 18% and filtered through cloth. This gave a low viscosity blue-purple solution which is a good paint drier. Yield of undiluted material 496 gms.

EXAMPLE 2

Zinc versatate butyl phosphate $PO(OBu)_2(OZnV)$

To 736 gms. of Versatic acid 911 (4 mol), 162.8 gms. (2 mol) of zinc oxide were added. The temperature of the slurry was raised and the water of reaction was distilled off. In 1½ hrs. the temperature rose to 198° C. and 30 mls. water were removed. Vacuum was used in the last stages to help strip off the water. The product at this stage was a low viscosity brown solution. On cooling to 162° C. 532 gms. of tributyl phosphate (2 mol) were added. The product was then heated under reflux at 190° C. for 5½ hrs. while the viscosity rose slowly. Then 6 mls. of water were distilled off. The product was a high viscosity brown solution containing butyl versatate as a diluent. The yield was 1380 gms.

EXAMPLE 3

Zinc tallate butyl phosphate PO(OBu)(OZnT)$_2$

To 580 gms. of tall oil fatty acid (2 mol) in a flask fitted with a stirrer, 162 gms. of zinc oxide (2 mol) was added at room temperature. On reacting the mixture increased greatly in viscosity. The temperature was raised to 78° C. over an hour giving a creamy slurry and then 148 gms. propionic acid (2 mol) was added slowly over another hour. This quickly gave an almost transparent moderate viscosity solution. The temperature was then raised to distill off the water of reaction and 36 mls. water and 2 mls. fatty layer distilled off in 1½ hours to a temperature of 164° C. The propionic acid which came off with the water layer was replaced and 266 gms. tributyl phosphate (1 mol) was added over 15 minutes at 160° C. causing a lowering of viscosity. The temperature was then raised to distill off the ester formed. In 50 mins. 123 mls. of ester distilled to a vessel temperature of 222° C. A low vacuum was then applied (ca 5 cms.) and 179 mls. distilled in 2¼ hrs. The yield was 830 gms. After diluting to 15% zinc with white spirit, the solution was filtered leaving negligible residue and giving a dark brown high viscosity solution.

EXAMPLE 4

Cadmium versatate phosphate PO·(OCdV)$_3$ 256 gms. cadmium oxide (2 mol) were added to 368 gms. Versatic acid 911 (2 mol) at 55° C. in a flask fitted with a stirrer, giving a moderately viscous red brown slurry. The temperature rose exothermically to 84° C. and then 30 gms. acetic acid (2 mol+8% XS) were added over five minutes. The temperature was then raised to distill off the water formed by the reaction and in 2 hrs., 38 mls. water and 10 mls. organic layer were removed. Vacuum was used in the later stages and the temperature rose to 192° C. At this stage the product was moderately viscous brown solution. The product was cooled to 160° C. and 177 gms. tributyl phosphate (⅔ mol) were added, the viscosity dropping a little. The temperature was then raised and the ester formed in the reaction removed. A small amount of vacuum was used to assist the removal. In 5 hrs., 295 mls. of ester were removed to a maximum vessel temperature of 226° C. The product was of moderate viscosity hot but is a hard brown solid at room temperature. It is almost completely soluble in white spirit. Yield 629 gms.

EXAMPLE 5

Cobalt versatate phosphate PO·(OCdV)$_3$ 386.4 gms. Versatic acid 911 (2.1 mol) were heated to 79° C. in a flask fitted with a stirrer and to this 192 gms. cobalt hydrate (2 mol) were added. This was allowed to react at 86° C. for 15 minutes and then a blend of 54 gms. glacial acetic acid (0.9 mol) and 121.5 gms. mixed butyl phosphoric acid (⅔ mol) was added over 5 minutes. The product which at this stage was rather viscous, was heated under atmospheric pressure to a temperature of 206° C. and over 4 hours 66.5 mls. of aqueous and 40 mls. organic material distilled. Vacuum was then applied rising to 72 cms. over 1 hr. 20 mins. Total vacuum distillate was 50.7 gms. The yield was 570.4 gms. The product was diluted to 18% cobalt and filtered to give a low viscosity blue-purple solution which is a good paint drier.

EXAMPLE 6

Magnesium tallate phosphate PO·(OMgT)$_3$

Crude isobutyl phosphoric acids were prepared by the reaction of 468 gms. P$_2$O$_5$ and 732 gms. of isobutyl alcohol to give a dark coloured oily product contained a minor proportion of tri-ester.

870 gms. (3 mols) of tall oil fatty acid were heated to 70° C. when an addition was made of 284 gms. (3 mols) of commercial heavy magnesium carbonate. Steady evolution of carbon dioxide occurred for 1 hour when the temperature was raised to 75° C. and an addition was made of a mixture of 90 gms. glacial acetic acid 1.5 mols and 182 gms. of crude isobutyl phosphoric acids was added over one hour. The temperature was raised to 98° C. over 2 hours at which point distillation commenced. Three fractions of distillate were recovered at 114° C. at 220° C. and finally under vacuum.

Distillate 1.—Total 100 cc. consisting of 64 cc. aqueous layer and 36 cc. organic layer.

Distillate 2.—Total 107.7 gms. consisting of 57.8 gms. aqueous layer and 49.9 gms. organic layer.

Distillate 3.—Single phase—34 gms.

Analysis of the three fractions indicated the following proportions of constituents

| | Gms. |
|---|---|
| Acetic acid | 33 |
| Isobutyl acetate | 15 |
| Isobutyl alcohol | 70 |
| Water | 100 |

The final product was a soft clear solid completely soluble in spindle oil.

Theory:

| | Gms. |
|---|---|
| Yield for (XMg)$_3$PO$_4$ | 1034 |
| Yield found | 1092.5 |

When 251 gms. of magnesium carbonate is used in the above preparation instead of 284 gms., a clear viscous oily product completely soluble in spindle oil is obtained in a yield of 1056 gms.

EXAMPLE 7

Calcium tallate phosphate PO.(OCaT)$_3$ 870 gms. of tall oil fatty acid (3 mols) were mixed with 30 gms. water and heated to 80° C. Precipitated calcium carbonate 300 gms. (3 mols) were added over 4 hours. Intermittent foaming occurred in the presence of 20 p.p.m. antifoam and the suspension was allowed to stand overnight. The slurry was reheated to about 55° C. and a mixture of 90 gms. of glacial acetic acid and 182 gms. of crude isobutyl phosphoric acids was added over a period of 4 hours again with intermittent foaming. The product was distilled as in Example 7 with the recovery of aqueous and non-aqueous layers to a final reaction temperature of 235° C. with vacuum in the final stage. The vacuum distillate consisted of 2 layers.

The final product is a clear waxy solid which can be fractured. 10% and 20% solutions in Carnea oil 15 prepared by heating and stirring are substantially clear low viscosity oily liquids.

When the above preparation was carried out with the omission of water no difficulty was experienced with foaming but the product was more opaque and had reduced oil solubility.

EXAMPLE 8

Calcium versatate phosphate PO(OCaV)$_3$ 546 gms. of Versatic acid (3 mols were heated to 80° C. and 288 gms. (3 mols) of cobalt hydrate were added and stirred in over 5 minutes, by which time the temperature had risen to 90° C. 222 gms. (3 mols) of propionic acid were then added over 8 minutes, and the mixture was raised to refluxing temperature, and refluxed for a period of 3 hours. The apparatus was then changed to distillation and volatile material was distilled off to a flask temperature of 194° C. In the final stages vacuum was applied. The distillate consisted of 11 mls. organic layer which separated on top of an aqueous layer of 115 mls., which contained 11.2 gms. of propionic acid. The organic layer and 11.2 gms. of propionic acid were returned to the flask. The contents of the flask were then cooled to 130° C. and 182 gms. (1 mol P) of commercially available mixed acid butyl phosphate was added over a period of 10 minutes. An immediate reduction in viscosity, and a change in colour of the product from purple to bright blue was noted. Over a period of 1 hour the temperature rose to 140° C. The temperature was then raised to distill volatile material. A distillate of 220 mls. was obtained with the flask temperature rising to 220° C. On applying vacuum a further 145 mls. of distillate was obtained.

On cooling the product was a hard solid. On warming the product readily dissolved in white spirit to give a bright blue low viscosity, easily filtering liquid of 12% Co content.

This product can be used as a paint drier.

EXAMPLE 9

Cadmium versatate phosphite P(OCdV)$_3$ 793 gms. of Versatic acid were mixed with 373 gms. of cadmium oxide over a period of 10 minutes at room temperature. An exothermic reaction took place giving a final temperature of 68° C. The product was then heated under reflux until all the cadmium oxide had dissolved to give a liquid of moderate viscosity. 87 gms. of acetic acid were then added and the product refluxed for 1 hour. Water was then distilled off using vacuum in the final stages. 40 gms. of water were recovered. The product was then heated to 140° C. and 188 gms. of dibutyl phosphite were added under reflux, giving a dark low viscosity liquid. The apparatus was changed to distillation and the volatile were taken off to a flask temperature of 204° C. 151 mls. of distillate were obtained. The product was a clear, dark brown viscous liquid, soluble in mineral oil.

EXAMPLE 10

Manganese versatate phosphate PO(OMnV)$_3$ 164.8 gms. of manganese metal were dissolved in 552 gms. of Versatic acid and 180 gms. of acetic acid to give 3 mols of Manganese versatate acetate. This product was reacted with 182 gms. of triethyl phosphate at 180° C. The reaction temperature was allowed to increase to 215° C. continuously distilling off ethyl acetate. Finally light vacuum was applied. 274 mls. of distillate were obtained giving a yield of 785 gms. of a liquid product.

EXAMPLE 11

Copper (iso-acids) phosphate PO.(OCuX)$_3$ 174 gms. of basic copper carbonate (¾ mol. CuCO$_3$Cu(OH)$_2$) was reacted with 234.6 gms. (1½ mols.) of 8–10 iso acids (obtainable from I.C.I. Ltd.) and 90 gms. (1½ mols) of acetic acid to 150° C. distilling off the water of reaction, finally using light vacuum.

The product was cooled to 120° C. and 91 gms. of triethyl phosphate (½ mol) was added over 10 minutes. The temperature was slowly raised to 180° C. when ethyl acetate slowly distilled off. The temperature was allowed to drop slightly as the reaction proceeded. Finally vacuum was applied and a total of 122 mls. of ethyl acetate was obtained. 361 gms. of product which was completely soluble in a mixture of alcohol and white spirit was obtained.

EXAMPLE 12

Cadmium versatate polyphosphate
(VCdO)$_2$PO.O(POCdV)$_n$OPO(OCdV)$_2$ 426.1 gms. of phosphorus pentoxide (3 mols) were reacted with 370 gms. (5 mols) of n-butanol in 700 mls. of ether to give an equilibrium mixture of n-butyl polyphosphoric acids, nominally a 50/50 mixture of $$O=\overset{\overset{OR}{|}}{P}-O-\overset{\overset{OR}{|}}{\underset{\underset{O}{\|}}{P}}-O-\overset{\overset{OR}{|}}{P}=O$$
$$\underset{OH}{|} \quad \underset{}{} \quad \underset{OH}{|}$$

and $$O=\overset{\overset{OH}{|}}{P}-O-\overset{\overset{OH}{|}}{\underset{\underset{O}{\|}}{P}}-O-\overset{\overset{OH}{|}}{P}=O$$
$$\underset{OR}{|} \quad \underset{}{} \quad \underset{OR}{|}$$

The ether was distilled off to give 812.9 gms. of a syrupy liquid.

200 gms. of cadmium versatate acetate were melted at a temperature of 168° C. and 45.5 gms. of the above equilibrium mixture of n-butyl phosphoric acids were slowly added. The temperature was raised and distillation was started at a flask temperature of 180° C. Distillation was continued to a flask temperature of 235° C., light vacuum being applied at the end. A distillate of 49 mls. of n-butyl acetate and acetic acid was recovered.

195 gms. (theoretical yield 195.4 gms.) of a viscous liquid product was obtained.

EXAMPLE 13

Zinc versatate polyphosphate 244.2 gm. (3 mols) of zinc oxide were reacted with 552 gms. (3 mols) of Versatic acid 911 (Shell Chemical Co.) and 180 gms. of acetic acid (3 mols). The water of reaction was distilled off and 239.1 gms. of n-butyl polyphosphoric acids as prepared in the above example were added. The temperature was slowly raised and a mixture of acetic acid and n-butyl acetate was distilled off. The reaction temperature was allowed to rise to 225° C. and vacuum was applied to remove the last traces of acetic acid and n-butyl acetate. 283 mls. of distillate were obtained, indicating complete reaction of the alkoxy and hydroxy groups on the phosphorus.

850 gms. of a very viscous liquid product was obtained.

EXAMPLE 14

Manganese versatate polyphosphate 164.8 gms. of manganese metal were dissolved in 552 gms. of Versatic acid and 180 gms. of acetic acid to give 3 gm. mol of manganese versatate acetate. This product was reacted with 239.1 gms. of mixed n-butyl polyphosphoric acids prepared as in Example 12. The reaction was carried out up to a temperature of 195° C., distilling a mixture of n-butyl acetate and acetic acid, applying vacuum in the last stages. 269 gms. of acetic acid and n-butyl acetate was obtained. (Theory distillate 264 gms.) A product yield of 811 gms. was obtained.

EXAMPLE 15

192 gm. (2 mol) cobalt hydrate was reacted with 368 gm. (2 mol) versatic acid 911 at 80° C. and then with 130 gm. (2 mol+excess) glacial acetic acid. The soap formed was dried up to 190° C. with vacuum in the last stages. To the soap at 160° C. 214 gm. (⅔ mol) triphenyl phosphite was added. This was heated for 7 hours at approximately 190° C. and then a small amount of vacuum was applied (maximum of 10 cons.). While the temperature of the flask rose to 212° C., 277.7 gm. of ester was distilled off. The yield at this stage was 516 gm. The product was diluted to 6% cobalt with white spirit and filtered to give a low viscosity blue purple solution. A small amount of residue was left unfiltered.

What is claimed is:

1. A metal organic compound which consists of a phosphorus atom, n divalent metal atoms selected from the group consisting of calcium, zinc, cadmium, cobalt, manganese, copper, magnesium, barium, lead, and zirconium in the form of the zirconyl radical=ZrO, wherein n is an integer from 1–3, each linked to the phosphorus atom through an oxygen atom, a carboxylic acid group of up to 30 carbon atoms selected from the group consisting of Versatic acid, tall oil fatty acids and 8 to 10 iso-acids attached to each divalent metal atom, and 3-n groups selected from the group consisting of hydroxy groups, alkoxy groups of up to 4 carbon atoms and phenyl groups the phosphorus atom additionally having an oxygen atom attached to it through a double bond.

References Cited

UNITED STATES PATENTS 3,321,499  5/1967  Juredine _____ 260—403

ALEX MAZEL, Primary Examiner

J. A. NARCAVAGE, Assistant Examiner

U.S. Cl. X.R.

106—310; 252—30.6, 32.5, 400; 260—2, 4.575, 45.85, 429.3, 429.9, 435, 438.1, 999